(12) United States Patent
Pan

(10) Patent No.: US 6,813,416 B2
(45) Date of Patent: Nov. 2, 2004

(54) MINIATURE FIBEROPTIC FILTER AND METHOD OF MANUFACTURE THEREFOR

(75) Inventor: Jing-Jong Pan, Milpitas, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 103 days.

(21) Appl. No.: 10/079,135

(22) Filed: Feb. 20, 2002

(65) Prior Publication Data

US 2003/0156786 A1 Aug. 21, 2003

(51) Int. Cl.[7] .................................................. G02B 6/26
(52) U.S. Cl. ............................. 385/39; 385/33; 385/50; 385/70
(58) Field of Search ............................. 385/27, 33, 39, 385/47, 50, 55, 58, 60, 66, 70, 72–74

(56) References Cited

U.S. PATENT DOCUMENTS

| | | | |
|---|---|---|---|
| 4,701,011 A | * 10/1987 | Emkey et al. ................. 385/34 |
| 5,037,180 A | * 8/1991 | Stone ........................... 385/123 |
| 5,134,470 A | * 7/1992 | Ravetti ......................... 385/98 |
| 6,014,483 A | * 1/2000 | Thual et al. ................... 385/33 |
| 6,280,099 B1 | * 8/2001 | Wu ............................... 385/73 |

* cited by examiner

Primary Examiner—John D. Lee
Assistant Examiner—Sarah U Song
(74) Attorney, Agent, or Firm—Ritter Lang & Kaplan LLP

(57) ABSTRACT

A miniature fiberoptic filter and manufacturing method is disclosed. Two aligned optical fibers, each with a step index multimode optical fiber segment and a graded index multimode optical fiber segment attached to the corresponding optical fiber, form the filter. The lengths of the step index and graded index multimode optical fiber segments define a collimation and focusing function for light from and to the optical fibers, and dielectric coatings covering the free end surface of the graded index multimode optical fiber segment of one optical fiber define a wavelength-dependent optical filter. The optical fibers are arranged and oriented so that light from the core of the first optical fiber passing through the plurality of dielectric coatings enters the core of the second optical fiber.

28 Claims, 5 Drawing Sheets

MINIATURE FIBEROPTIC FILTER AND METHOD OF MANUFACTURE THEREFOR

BACKGROUND OF THE INVENTION

The present invention is related to miniaturized fiberoptic devices and, in particular, to highly miniaturized wavelength fiberoptic filters.

In WDM (Wavelength Division Multiplexing) and DWDM (Dense Wavelength Division Multiplexing) fiberoptic networks, optical signals are directed through the network on optical fibers according to the wavelength of the optical signals. Optical signals of a particular wavelength define a communication channel of a network which directs signals to their destinations according to their wavelengths. One element of such fiberoptic networks is the wavelength filter which passes or blocks optical signals according to their wavelengths. Heretofore, fiberoptic filter devices have been compact, but limited by the size of the discrete elements, such as a GRIN (GRaded INdex) lens which is commonly used to form the filter. Manufacture of such wavelength filter devices requires assembly of such separate elements.

On the other hand, the present invention allows for a fiberoptic filter device which is highly miniaturized and which is limited in size only by the dimensions of the optical fiber.

SUMMARY OF THE INVENTION

The present invention provides for a miniature fiberoptic filter which has a first optical fiber with a first multimode optical fiber segment attached to an end of the first optical fiber, a second multimode optical fiber segment attached to the first multimode optical fiber segment, and a plurality of dielectric coatings on an end of the second multimode optical fiber segment opposite the first multimode optical fiber segment. The first multimode optical fiber segment has a step index with its core axially aligned with the core of the first optical fiber, and the second multimode optical fiber segment has a graded index of refraction core axially aligned with the core of the first multimode optical fiber segment. The lengths of the first and second multimode optical fiber segments are selected to define a collimation and focusing function for light from and to the first optical fiber. The plurality of dielectric coatings form a wavelength-dependent optical filter.

The miniature fiberoptic filter also has a second optical fiber with a third multimode optical fiber segment attached to an end of the second optical fiber, and a fourth multimode optical fiber segment attached to the third multimode optical fiber segment. The third multimode optical fiber segment has a step index with its core axially aligned with a core of the second optical fiber, and the fourth multimode optical fiber segment has a graded index of refraction core axially aligned with the core of the third multimode optical fiber segment. The lengths of the third and fourth multimode optical fiber segments are selected to define a collimation and focusing function for light from and to the second optical fiber which is aligned with the first optical fiber so that the end of the fourth multimode optical fiber opposite the third multimode optical fiber segment faces the end of the second multimode optical fiber segment. The first optical fiber, the first multimode optical fiber segment, the second multimode optical fiber segment, the plurality of dielectric coatings, the second optical fiber, the third multimode optical fiber segment, and the fourth multimode optical fiber segment arranged and oriented with each other so light from the core of the first optical fiber passing through the plurality of dielectric coatings enters the core of the second optical fiber.

The present invention also provides for a method of manufacturing a miniature fiberoptic filter which has the steps of fixing first and second multimode fiber segments to a first optical fiber end section, the first multimode fiber segment placed between the first optical fiber end section and the second multimode fiber segment, with the first multimode fiber segment having a step index of refraction and the second multimode fiber segment having a graded index of refraction core; selecting lengths of the first and second multimode fiber segments to define a collimation and focusing function for light from and to the first optical fiber end section; depositing a plurality of dielectric layers upon an end surface of the second multimode fiber segment opposite the first multimode fiber segment, the plurality of dielectric layers defining a wavelength-dependent filtering function; fixing third and fourth multimode fiber segments to a second optical fiber end section, the third multimode fiber segment between the second optical fiber end section and the fourth multimode fiber segment, the third multimode fiber segment having a step index of refraction and the fourth multimode fiber segment having a graded index of refraction core; selecting lengths of the third and fourth multimode fiber segments to define a collimation and focusing function for light from and to the second optical fiber end section; and arranging and orienting the first optical fiber end section and fixed first and second multimode fiber segments with the second optical fiber end section and fixed third and fourth multimode fiber segments so light from a core of the first optical fiber end section passing through the plurality of dielectric coatings enters a core of the second optical fiber end section.

DESCRIPTION OF THE SPECIFIC EMBODIMENTS

Figure 1A:
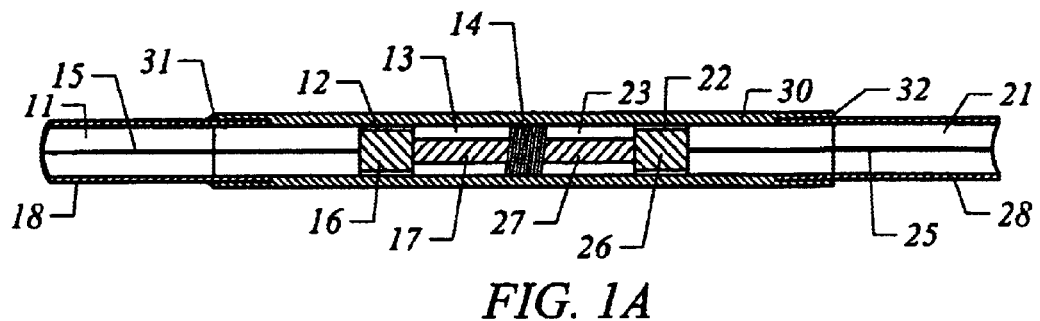
FIG. 1A is a cross-sectional side view of a wavelength filter according to one embodiment of the present invention.

FIG. 1A illustrates one embodiment of a fiberoptic wavelength filter according to the present invention. The filter is formed by the two end sections 11, 21 of single-mode optical fibers, which are placed against each other in a sleeve 30. Each end section 11, 21 has a core 15, 25 respectively, which is surrounded by a cladding. At the end of each single mode end section 11, 21 is respectively attached a first multimode optical fiber segment 12, 22. A second multimode optical fiber segment 13, 23 is respectively attached to the first multimode optical fiber segment 12, 22. The first multimode optical fiber segments 12 and 22 are formed from multimode fibers having step indices of refraction, i.e., the index of refraction of the cores are uniform. The second multimode optical fiber segments 13 and 23 are formed from multimode fibers having graded index of refraction cores. The end surface of one of the second multimode fiber segments 13, 23 is coated by a plurality of dielectric layers 14 having materials and thicknesses selected for the desired filter function.

The lengths of the first multimode fiber segment 12 and the second multimode fiber segments 13 are selected so that light from the core 15 of the end section 11 is collimated and the collimated light entering the second multimode fiber segment 13 and passing through the first multimode fiber segment 12 is focused at the end of the core 15 at the juncture of the segment 12 and section 11. Likewise, the lengths of the first and second multimode fiber segments 22 and 23 are selected so that collimated light entering the second multimode fiber segment 23 and passing through the first multimode fiber segment 22 is focused at the end of the core 25 of the second optical fiber end section 21 at the juncture of the segment 22 and end section 21. Of course, in the reverse direction, light from the core 25 of the second optical fiber end section 21 is collimated after passing through the first and second multimode fiber segments 22 and 23.

Figure 1B:
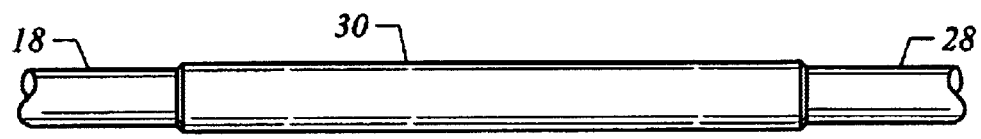
FIG. 1B is an exterior side view of the wavelength filter of FIG. 1A.

The optical fiber end sections 11 and 21 are protected by metal coatings 18 and 28 respectively with portions of the end sections 11 and 21, the first multimode fiber segments 12, 22 and second multimode segments 13 and 23 left free. Metallization processes commonly used in the semiconductor industry are used to deposit the metal coatings 18 and 28 around the portions of the fibers sections 11 and 21. Metals, such as gold, may be used. Fitting over portions of the metal coatings 18 and 28, the metal sleeve 30 fixes the end sections 11 and 21 (and their attached multi segments) against each other. With the metal coatings 18 and 28 of gold, and the sleeve 30 of stainless steel, the end sections 11, 21 are fixed to the sleeve 30 by laser solders or welds 31, 32 respectively. FIG. 1B shows the exterior of the assembled wavelength filter, i.e., its package. The metal center sleeve 30 of a wall thickness of about 0.1 mm and the cylindrical metal coatings 18 and 28 which form metal sleeves for the optical fiber end sections 11, 21 protect the inner assembly of the wavelength filter. A truly miniaturized fiberoptic wavelength filter is created which has a diameter of approximately 0.325 mm, no much larger than the diameter of an optical fiber with its protective jacket. Hence an optical filter in a cylindrincal package with an outside diameter less than 0.4 mm is achieved.

In the operation of the described wavelength filter, light traveling through the core 15 of the optical fiber end section 11 is collimated by the action of the step index and graded index multimode fiber segments 12 and 13. Depending upon the wavelength of the light and the particular materials and construction of the deposited layers 14, the light is either blocked or passed by the layers 14. The passed light is refocused by the graded index and step index multimode fiber segments 23 and 22 at the core 25 of the optical fiber end section 21. In this manner, light from the optical fiber end section 11 is transmitted to the optical fiber end section 21. Similarly, light from the optical fiber end section 21 passes to the optical fiber end section 11 if transmitted through the layers 14. Light which is blocked by the layers 14 in one direction is also blocked in the opposite direction.

To lower manufacturing costs, various steps can be taken for mass production of the elements of the miniaturized filter. For example, one way of simultaneously attaching several first and second multimode fiber segments to the optical fiber end sections is disclosed in U.S. Pat. No. 6,014,483, entitled, "Method of Fabricating A Collective Optical Coupling Device and Device Obtained By Such A Method," and which issued Jan. 11, 2000 to M. Thual et al.

For optimum performance, it has been found that lengths of 610±10 $\mu$m for the step index multimode fiber sections 12, 22 and 135±5 $\mu$m for the graded index multimode fiber sections 13, 23 are most suitable. Of course, these parameters are dependent upon the particular optical fiber used, including its manufacturer. Furthermore, the optical performance of each optical fiber end section, attached step index multimode fiber segment and graded index multimode fiber segment is not identical. Pairs of optical fiber end sections 11 and attached multimode fiber segments 12, 13 are matched with optical fiber end sections 21 and attached multimode fiber segments 22, 23 so that the optical fiber end section transmitting the light signals is identical as possible to the optical fiber end section receiving the light signals for the best coupling and mode mismatch is avoided.

Furthermore, it should be realized that each of the step index multimode fiber sections 12, 22 has a core with a uniform index of refraction, in effect, a glass rod with a uniform index of refraction. Hence glass rods with suitable lengths, diameters and indices of refraction can be used in place of the multimode fiber sections 12, 22. From the standpoint of the present invention, the step index multimode fiber sections are considered generalization of such glass rods.

Figure 2A:
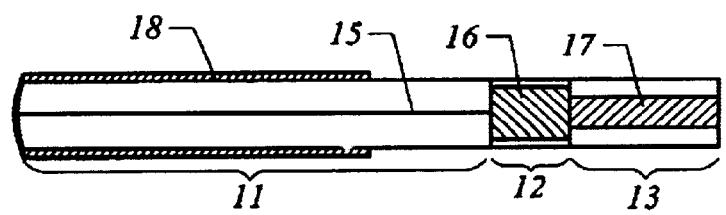
FIGS. 2A–2C are detailed cross-sectional side views of a portion of the wavelength filter to illustrate some manufacturing steps for the FIG. 1A filter in accordance with the present invention.
Figure 2B:
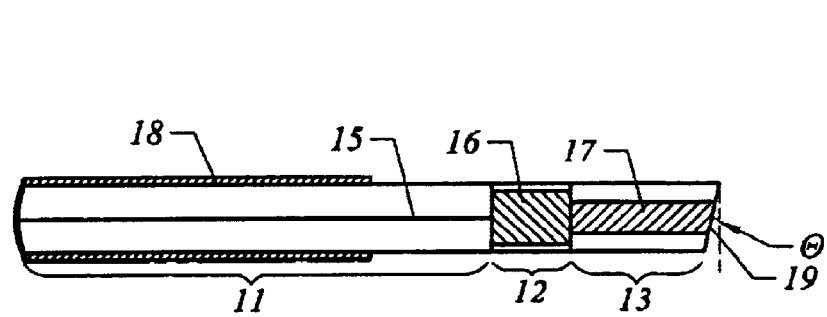
Figure 2C:
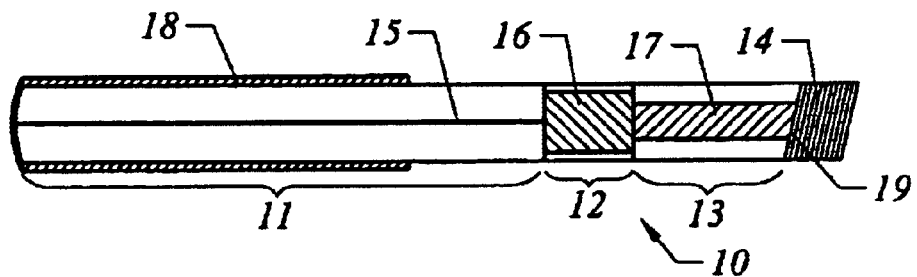

To avoid the problem of back reflection in the described wavelength filter, the free end surfaces of the graded index multimode segments 13 and 23 are not exactly perpendicular to the respective longitudinal axes of the multimode segments 13, 23 (and the joined sections 11, 21, and first multimode segments 12, 22). Rather, the end surfaces are off the perpendicular by a small angle $\theta$, in the range of 1–3°. The general steps of creating the angle $\theta$ on the end surface of the multimode segment 13 is illustrated in FIGS. 2A–2C. First, the left optical fiber end section 11, the step index multimode fiber segment 12 and the graded index multimode fiber segment 13 are joined together as shown in FIG. 2A. The manufacturing technique of the above-cited U.S. Pat. No. 6,014,483 could be used. Then the free end surface of the segment 13 is angle-polished at the angle $\theta$. This is illustrated by FIG. 2B. More details of the angle-polishing process are described below.

Finally, since the left side (in FIG. 1A) multimode fiber segment 13 has been arbitrarily selected, the multiple layers of dielectric coatings 14 are deposited on the end surface of the multimode fiber segment as illustrated in FIG. 2C. U.S. Pat. No. 6,039,806, entitled, "Precision Thickness Optical Coating System and Method of Operation Thereof," and which issued Mar. 21, 2000 to Ming Zhou et al., describes the equipment and operations used to make such dielectric deposition coatings. As noted in the patent which is incorporated herein by reference, over 100 dielectric layers may be deposited to selectively create optical filters with low-pass, high-pass, and even bandpass, functions.

Figure 2D:
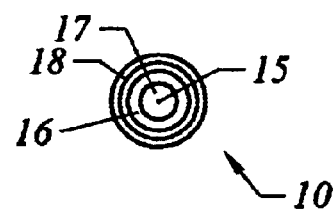
FIG. 2D is a cross-sectional end view of a portion of the filter shown in FIGS. 2A–2C.

FIG. 2D show the relative diameters of the core 15 of the optical fiber end section 11, the core 16 of the step index multimode fiber segment 12 and the core 17 of the graded index multimode fiber segment 13, by a cross-sectional end view.

Figure 3A:
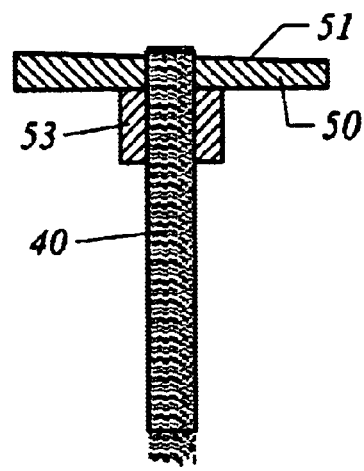
FIG. 3A is a cross-sectional side view of a fixture holding several optical fiber end sections and attached multimode optical fiber segments to illustrate a step in manufacturing the FIG. 1A filter.
Figure 3B:
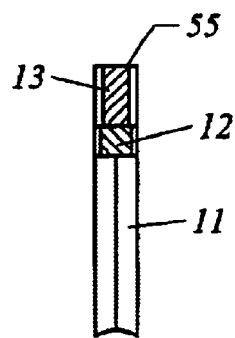
FIG. 3B is a detailed cross-sectional side view of an optical fiber end section and attached multimode segments after the operation represented in FIG. 3A.
Figure 3C:
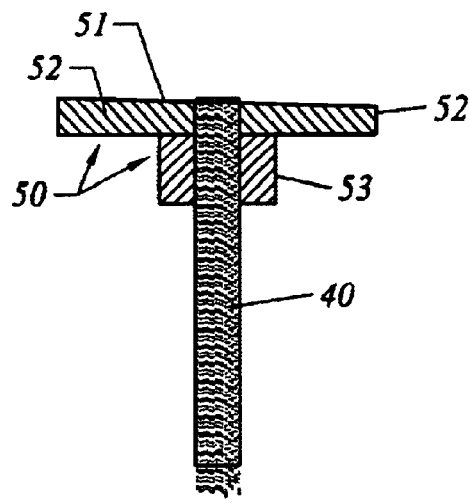
FIG. 3C is a cross-sectional side view of the fixture holding the optical fiber end sections and attached multimode optical fiber segments to illustrate a step following the FIG. 3A step.
Figure 3D:
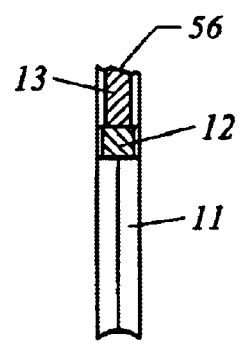
FIG. 3D is a detailed cross-sectional side view of the end section and attached multimode segments after the operation represented in FIG. 3C.
Figure 3E:
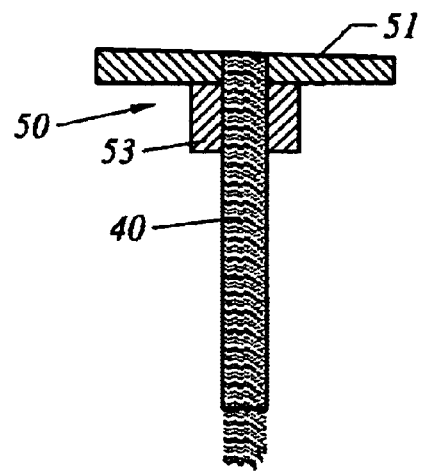
FIG. 3E is a cross-sectional side view of the fixture holding the optical fiber end sections and attached multimode optical fiber segments to illustrate a step following the FIG. 3E step.
Figure 3F:
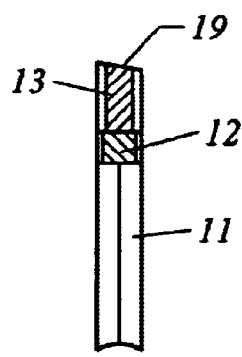
FIG. 3F is a detailed cross-sectional side view of the resulting end section and attached multimode segments after the FIG. 3E operation.

FIGS. 3A–3F detail the angle-polishing operations for mass production. A plurality of single mode optical fiber end sections having attached step index multimode fiber segments and graded index multimode fiber segments are aligned in a bundle 40 of about 300 to over 1000 fibers and held in a special fixture 50 designed for the angle-polishing operation. Though not apparent from FIG. 3A, the fixture 50 is shaped like a hollow cylinder 53 which is topped by a flattened disk 52 with a central aperture. The hollow cylinder 53 helps hold the fiber bundle 40 and the flattened disk 52 with an upper surface 51 provides a guide or stop for angle polishing the end surfaces of the fiber segments. The surface 51 is tilted slightly from the axis of the hollow cylinder 53 and the bundle 40 by the angle θ (see FIG. 4C). The optical fiber end sections with attached step index multimode fiber segments and graded index multimode fiber segments, as shown in the detail in FIG. 3B, are aligned in the bundle 40 with a small amount of the graded index segments protruding from the top surface 51 of the fixture 50. The protrusions, which extend equally above the slanted top surface are removed in a coarse polishing step using the top surface 51 as a guide (see FIG. 3C). This leaves the end surface 56 of the graded index segments rough, as shown in the detail of FIG. 3D. Then, as represented by FIG. 3E, a polishing or lapping operation which again uses the top surface 51 as a guide smooths the end surface of the graded index segments, as shown by the detail of FIG. 3F.

Figure 4C:
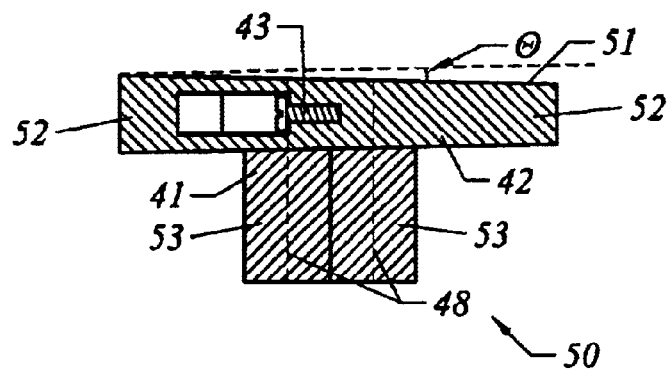
FIG. 4C is a detailed cross-sectional side view of the FIG. 4A fixture.
Figure 4A:
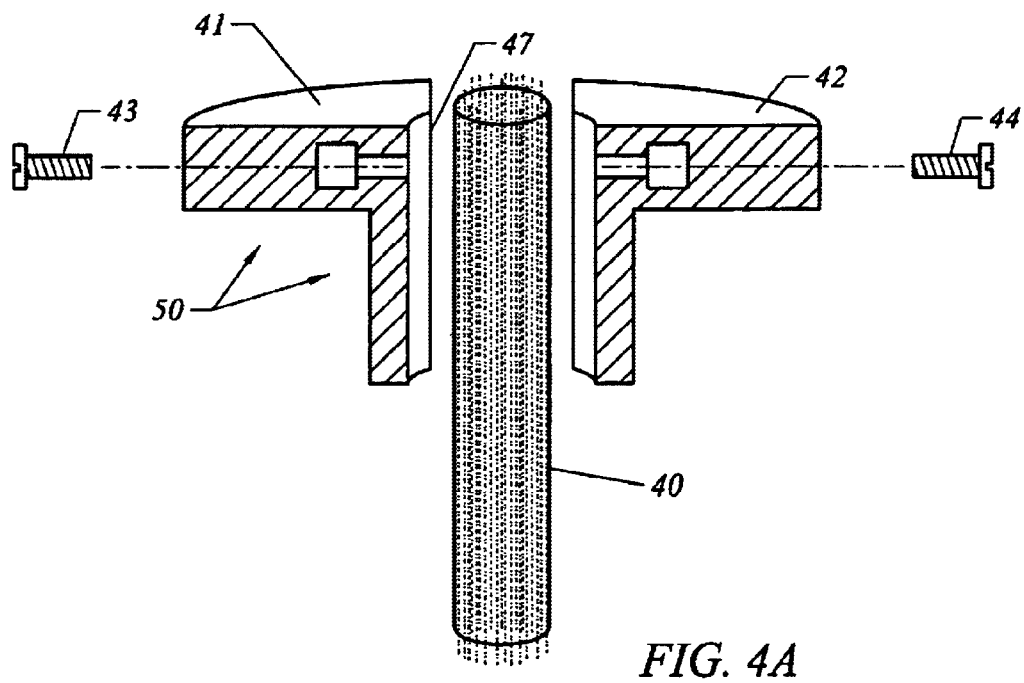
FIG. 4A is a detailed exploded view of the fixture used in the manufacturing steps illustrated in FIGS. 3A–3E.
Figure 4B:
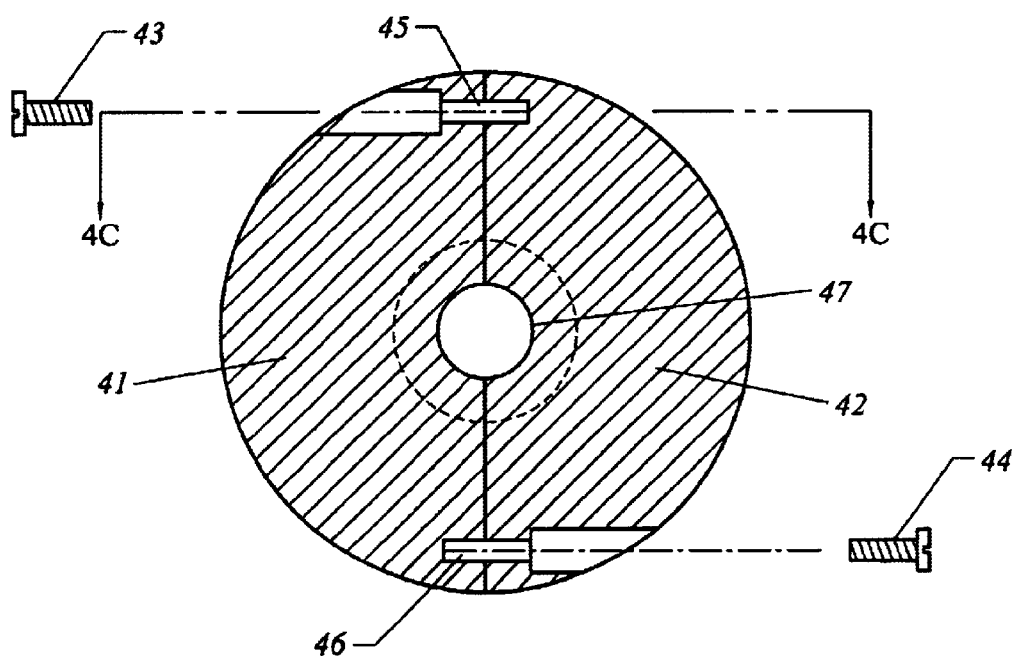
FIG. 4B is a detailed top view of the FIG. 4A fixture.

The fixture 50 is shown in greater detail in FIGS. 4A–4C. The exploded view in FIG. 4A shows that the fixture 50 has two halves 41 and 42, each having one-half of the disk 52 and hollow cylinder 53. The halves 41 and 42 are fastened together by a pair of screws 43 and 44 which fit into recesses in the fixture halves 41 and 42 to engage threaded shafts 46 and 47 which pass through both halves, as better shown in the top view of FIG. 4B. When the two halves 41, 42 are joined, cylindrical walls 48 create a central opening 47 to hold the fiber bundle 40. As illustrated in the side view of FIG. 4C, the top surface 51 of the disk portion 52 of the fixture 50 is off from the perpendicular of the longitudinal axis of the central opening 47 and the fixture 50 by the angle θ. Hence with the described fixture, the end surfaces of the graded index multimode fiber sections can be angle-polished quickly and in great numbers for superior manufacturing efficiencies.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A miniature fiberoptic filter comprising
a first optical fiber;
a first multimode optical fiber segment attached to an end of said first optical fiber, said first multimode optical fiber segment having a step index of refraction and axially aligned with said first optical fiber, said first multimode optical fiber segment having a first length;
a second multimode optical fiber segment attached to said first multimode optical fiber segment, said second multimode optical fiber segment having a graded index of refraction core and axially aligned with said first multimode optical fiber segment, said second multimode optical fiber segment having a second length, said first and second lengths selected to define a collimation and focusing function for light from and to said first optical fiber;
a plurality of dielectric coatings directly on an endsurface of said second multimode optical fiber segment opposite said first multimode optical fiber segment, said plurality of dielectric coatings forming a wavelength-dependent optical filter;
a second optical fiber;
a third multimode optical fiber segment attached to an end of said second optical fiber, said third multimode optical fiber segment having a step index of refraction and axially aligned with said second optical fiber, said third multimode optical fiber segment having a third length; and
a fourth multimode optical fiber segment attached to said third multimode optical fiber segment, said fourth multimode optical fiber segment having a graded index of refraction core and axially aligned with said third multimode optical fiber segment, said fourth multimode optical fiber segment having a fourth length, said third and fourth lengths selected to define a collimation and focusing function for light from and to said second optical fiber, said fourth multimode optical fiber segment having an endsurface opposite said third multimode optical fiber segment facing said endsurface of said second multimode optical fiber segment and abutting said plurality of dielectric coatings on said endsurface of said second multimode optical fiber segment;
said first optical fiber, said first multimode optical fiber segment, said second multimode optical fiber segment, said plurality of dielectric coatings, said second optical fiber, said third multimode optical fiber segment, said fourth multimode optical fiber segment arranged and oriented with each other so light from said core of said first optical fiber passing through said plurality of dielectric coatings enters said core of said second optical fiber.

2. The miniature fiberoptic filter of claim 1 comprising a cylindrical package holding an end section of said first optical fiber, said first multimode optical fiber segment, said second multimode optical fiber segment, an end section of said second optical fiber, said third multimode optical fiber segment, said fourth multimode optical fiber segment, said cylindrical package having an outside diameter less than 0.4 mm.

3. The miniature fiberoptic filter of claim 2 wherein said cylindrical package comprises a metal sleeve engaging portions of said end sections of said first and second optical fibers, each portion having a metal coating closely engaging said metal sleeve.

4. The miniature fiberoptic filter of claim 3 wherein said cylindrical package has a circular cross-section.

5. The miniature fiberoptic filter of claim 3 wherein each metal coating is fixed to said metal sleeve.

6. The miniature fiberoptic filter of claim 5 wherein each metal coating is fixed to said metal sleeve by a laser solder.

7. The miniature fiberoptic filter of claim 5 wherein each metal coating is fixed to said metal sleeve by a laser weld.

8. The miniature fiberoptic filter of claim 1 wherein said plurality of dielectric coatings form a low-pass filter.

9. The miniature fiberoptic filter of claim 1 wherein said plurality of dielectric coatings form a high-pass filter.

10. The miniature fiberoptic filter of claim 1 wherein said plurality of dielectric coatings form a bandpass filter.

11. The miniature fiberoptic filter of claim 1 wherein said end of said second multimode optical fiber segment is angled from a plane perpendicular to a longitudinal axis of said second multimode optical fiber segment.

12. The miniature fiberoptic filter of claim 11 wherein said end of said fourth multimode optical fiber segment is reciprocally angled with respect to said end of said second multimode optical fiber segment.

13. A method of manufacturing a miniature fiberoptic filter comprising
fixing first and second multimode fiber segments to a first optical fiber end section, said first multimode fiber segment between said first optical fiber end section and said second multimode fiber segment, said first multimode fiber segment having a step index of refraction and said second multimode fiber segment having a graded index of refraction core;
selecting lengths of said first and second first and second multimode fiber segments to define a collimation and focusing function for light from and to said first optical fiber end section;
depositing a plurality of dielectric layers directly upon an end surface of said second multimode fiber segment opposite said first multimode fiber segment, said plurality of dielectric layers defining a wavelength-dependent filtering function;
fixing third and fourth multimode fiber segments to a second optical fiber end section, said third multimode fiber segment between said second optical fiber end section and said fourth multimode fiber segment, said third multimode fiber segment having a step index of refraction and said fourth multimode fiber segment having a graded index of refraction core;
selecting lengths of said third and fourth multimode fiber segments to define a collimation and focusing function for light from and to said second optical fiber end section; and
arranging and orienting said first optical fiber end section and fixed first and second multimode fiber segments with said second optical fiber end section and fixed third and fourth multimode fiber segments so that said fourth multimode fiber segment abuts said plurality of dielectric layers and so that light from a core of said first optical fiber end section passing through said plurality of dielectric coatings enters a core of said second optical fiber end section.

14. The method of claim 13 further comprising
angle-polishing said end surface of said second multimode fiber segment and an end surface of said fourth multimode fiber segment opposite said third multimode fiber segment so that said end surfaces are angled from a perpendicular to a longitudinal axis of said second and fourth multimode fibers segments respectively.

15. The method of claim 14 wherein said angle-polishing step comprises simultaneously angle-polishing end surfaces of a plurality of multimode fiber segments in a fixture having an angle-polishing guide surface at an angle to a perpendicular plane to said plurality of multimode fiber segments in said fixture.

16. The method of claim 15 wherein said angle-polishing step comprises simultaneously angle-polishing end surfaces of at least 300 multimode fiber segments.

17. The method of claim 13 wherein said first and third multimode fiber segments comprise step index multimode fiber segments, and wherein said selecting steps comprise selecting lengths of said first and third multimode segments approximately 610 $\mu$m.

18. The method of claim 13 wherein said second and fourth multimode fiber segments comprise graded index fiber segment, and wherein said selecting steps comprise selecting lengths of said second and fourth multimode segments approximately 135 $\mu$m.

19. The method of claim 13 further comprising
forming metal coating over predetermined portions of said first and second optical fiber end sections; and
fitting a metal sleeve over said first optical fiber end section with said fixed first and second multimode fiber segments and said second optical fiber end section with said fixed third and fourth multimode fiber segments; and
fixing said metal sleeve to said metal coatings.

20. The method of claim 19 wherein said fitting step comprises selecting a metal sleeve having an outside diameter less than 0.4 mm.

21. A method of manufacturing a miniature fiberoptic filter comprising
forming metal coatings over predetermined portions of first and second optical fiber end sections;
fixing first and second multimode fiber segments to said first metal-coated optical fiber end section, said first multimode fiber segment between said first metal-coated optical fiber end section and said second multimode fiber segment, said first multimode fiber segment having a step index of refraction and said second multimode fiber segment having a graded index of refraction core;
selecting lengths of said first and second first and second multimode fiber segments to define a collimation and focusing function for light from and to said metal-coated first optical fiber end section;
depositing a plurality of dielectric layers directly upon an end surface of said second multimode fiber segment opposite said first multimode fiber segment, said plurality of dielectric layers defining a wavelength-dependent filtering function;
fixing third and fourth multimode fiber segments to said second metal-coated optical fiber end section, said third multimode fiber segment between said second metal-coated optical fiber end section and said fourth multimode fiber segment, said third multimode fiber segment having a step index of refraction and said fourth multimode fiber segment having a graded index of refraction core;
selecting lengths of said third and fourth multimode fiber segments to define a collimation and focusing function for light from and to said second metal-coated optical fiber end section; and
arranging and orienting said first metal-coated optical fiber end section and fixed first and second multimode fiber segments with said second metal-coated optical fiber end section and fixed third and fourth multimode fiber segments in a metal sleeve so that said fourth multimode fiber segment abuts said plurality of dielectric layers and so that light from a core of said first optical fiber end section passing through said plurality of dielectric coatings enters a core of said second optical fiber end section.

22. The method of claim 21 further comprising fixing said metal sleeve to said first and second metal-coated of optical fiber end sections.

23. The method of claim 21 wherein said fitting step comprises selecting a metal sleeve having an outside diameter less than 0.4 mm.

24. The method of claim 21 further comprising angle-polishing said end surface of said second multimode fiber segment and an end surface of said fourth multimode fiber segment opposite said third multimode fiber segment so that said end surfaces are angled from a perpendicular to a longitudinal axis of said second and fourth multimode fibers segments respectively.

25. The method of claim 24 wherein said angle-polishing step comprises simultaneously angle-polishing end surfaces of a plurality of multimode fiber segments in a fixture having an angle-polishing guide surface at an angle to a perpendicular plane to said plurality of multimode fiber segments in said fixture.

26. The method of claim 25 wherein said angle-polishing step comprises simultaneously angle-polishing end surfaces of at least 300 multimode fiber segments.

27. The method of claim 21 wherein said first and third multimode fiber segments comprise step index multimode fiber segments, and wherein said selecting steps comprise selecting lengths of said first and third multimode segments approximately 610 $\mu$m.

28. The method of claim 21 wherein said second and fourth multimode fiber segments comprise graded index fiber segment, and wherein said selecting steps comprise selecting lengths of said second and fourth multimode segments approximately 135 $\mu$m.

* * * * *